United States Patent
Blümcke et al.

[11] Patent Number: 6,100,539
[45] Date of Patent: Aug. 8, 2000

[54] LIGHT SENSOR WITH EVALUATION OF THE LIGHT TRANSIT TIME

[75] Inventors: Thomas Blümcke, Gutach; Hans-Joachim Breisacher, Bahlingen, both of Germany

[73] Assignee: Sick AG, Waldkirch/Breisgau, Germany

[21] Appl. No.: 09/008,937

[22] Filed: Jan. 20, 1998

[30] Foreign Application Priority Data

Jan. 20, 1997 [DE] Germany ............... 197 01 803

[51] Int. Cl.⁷ ................................................. G01C 3/08
[52] U.S. Cl. ................................. 250/559.38; 356/5.01
[58] Field of Search .................. 250/559.38, 559.29, 250/221; 356/5.01, 5.05, 5.07, 4.01, 4.07, 375; 359/154, 155, 161

[56] References Cited

U.S. PATENT DOCUMENTS 5,805,468  9/1998  Blohbaum ..................... 356/5.01

FOREIGN PATENT DOCUMENTS

| | | |
|---|---|---|
| 0449596A2 | 10/1991 | European Pat. Off. . |
| 0477092A1 | 3/1992 | European Pat. Off. . |
| 0529876A1 | 3/1993 | European Pat. Off. . |
| 0541292A2 | 5/1993 | European Pat. Off. . |
| 0714035A1 | 5/1996 | European Pat. Off. . |
| 2258639 | 8/1975 | France . |
| 250588A1 | 10/1987 | Germany . |
| 4217423A1 | 2/1994 | Germany . |
| 4422886A1 | 1/1996 | Germany . |
| 19517001A1 | 11/1996 | Germany . |

OTHER PUBLICATIONS

Lewers, Karl: Mit mobilen Datenterminals Kundenprobleme angehen. In: Online Sep. 1981, pp. 566 and 567.

Tamiya N, et al.: "Optical spread spectrum radar for lateral detection in vehicles", 1996 IEEE 4$^{th}$ International Symposium on Sprectrum Techniques and Applications Proceedings. Techniques and Applications Proceedings. Technical Program. (CAT NO. 96$^{th}$8210) Proceedings of isssta '95 International Syposium on Spread Spectrum Techniques and Applications, Mainz, Germany, pp. 195–198 vol. 1, XP002107877 ISBN 0–7803–3567–8, 1996, New York, NY, USA, IEEE, USA.

*Primary Examiner*—Que T. Le
*Assistant Examiner*—Kevin Pyo
*Attorney, Agent, or Firm*—Townsend and Townsend and Crew LLP

[57] ABSTRACT

The invention relates to a light sensor comprising a light transmitter for transmitting a light signal ($T_x$, $T_{xd}$) into a region to be monitored, a light receiver for receiving a reflected light signal ($R_x$) from an object present in the monitored region, at least one signal generator for producing a first signal ($T_x$) to energize the light transmitter and also for producing a second signal ($L_0$) standing in a defined phase relationship to the first signal ($T_x$), but with a different signal shape in comparison to the first signal ($T_x$), and also a correlation stage for producing the correlation function (KKF) between the received light signal ($R_x$) and the second signal ($L_0$, $L_{0d}$) as well as an evaluation stage following the correlation stage for determining information related to the distance between the light sensor and the object.

14 Claims, 3 Drawing Sheets

LIGHT SENSOR WITH EVALUATION OF THE LIGHT TRANSIT TIME

FIELD OF THE INVENTION

The invention relates to a light sensor based on the principle of light transit time evaluation comprising a light transmitter for the transmission of a light signal into a region to be monitored and a light receiver for receiving a light signal reflected from an object present in the monitored region, wherein a conclusion is drawn on the distance between the light sensor and the object by finding the time which has elapsed between the transmission of the light signal and its reception.

DESCRIPTION OF THE PRIOR ART

In addition to the above named light sensors based on the principle of light transit time evaluation, sensors also exist which are based on the principle of triangulation in which the light transmitter and the light receiver are to be arranged alongside one another in order to determine the angle between a transmitted light beam and a received light beam and to determine the distance between the light sensor and the object from this angle. These triangulation systems have the disadvantage that with reflective objects falsification of the angle found can arise through tilting, which ultimately results in the determination of a wrong distance. Furthermore, it is of disadvantage that with large detection distances only a low accuracy is available. This can only be compensated with a constructional shape of the light sensor which is too large, because the transmitting optical system and receiving optical system must have an adequately large spacing from one another. However, this relatively large spacing, between the optical transmitting and receiving systems means, in turn, in disadvantageous manner, that objects located very close to the light sensor cannot be detected.

For the above named reasons, the use of light sensors based on the principle of light transit time evaluation is thus fundamentally of advantage because these sensors do not have the above described disadvantages. However, these light sensors, which are based on the principle of light transit time evaluation, are associated with a relatively high technical cost and complexity, because complex signal processing is necessary to determine the light transit time. Furthermore, such light transit time, sensors, which calculate the light transit time through a correlation between the transmitted signal or a reference signal and the received signal, have, in particular, a small range in which the measurement is unambiguous, which is likewise a disadvantage.

OBJECT OF THE INVENTION

An object of the invention is to make available a light sensor based on the principle of light transit time evaluation, which can be manufactured with a low economical cost and complexity and which has the largest possible range of non-ambiguity.

BRIEF DESCRIPTION OF THE INVENTION

This object is satisfied in accordance with the invention by a light sensor comprising a light transmitter for transmitting a light signal $T_x$, $T_{xd}$ into a region to be monitored, a light receiver for receiving a reflected light signal $R_x$ from an object present in the monitored region, at least one signal generator for producing a first signal $T_x$ to energize the light transmitter and also for producing a second signal $L_0$ standing in a defined phase relationship to the first signal $T_x$, but with a different signal shape in comparison to the first signal $T_x$, and also with a correlation stage for producing the correlation function KKF between the received light signal $R_x$ and the second signal $L_0$, $L_{0d}$ as well as an evaluation stage following the correlation stage for determining information related to the distance between the light sensor and the object.

In distinction to the initially named light transit time sensors which are based on a correlation principle, a correlation function is formed in accordance with the invention between the received light signal and a second signal, with the second signal and the transmitted light signal either being generated at the same time or having a known time shift relative to one another. The transmitted light signal and the received light signal have a signal shape which thereby differs from the second signal, which makes it possible to select the signal shapes so that ultimately a non-linear shape of the correlation function arises. This non-linearity can be selected, by a corresponding choice of the signal shapes that are used, so that the value of the correlation function outside of the respective sensing range of interest lies above or below an upper or lower threshold respectively, and so that a relatively steep shape of the correlation function arises between the upper and lower threshold within the sensing range of interest. This steep shape of the correlation function within the sensing range of interest leads to a very high accuracy of the light sensor of the invention, in particular distances of approximately 6 m can, for example, be determined with an accuracy of 1 to 2 cm.

As the correlation function extends outside of the sensing range of interest, above or below the upper or lower threshold respectively, no problem exists in these regions with respect to the lack of ambiguity of the light sensor of the invention. An ambiguity problem of this kind could only exist if the value of the correlation function outside of the sensing range of interest would be located between the lower and upper threshold, which is not, however, the case with a corresponding choice of the two named signal shapes.

The first signal energizing the light transmitter in accordance with the invention and also the second signal used for the formation of the correlation function preferably have the same period lengths with respect to each other.

It is of advantage when the signal shapes of the first and second signal are selected such that the correlation function formed between the two signals has an amplitude step in the range of one period which is larger and/or steeper than all further amplitude steps which occur during this one period. This one amplitude step then relates precisely to that region of the correlation function which is used for the evaluation and determination of the scanning distance. As a result of its steepness the respective sensing distance can be very accurately determined.

The light sensor of the invention can be realized particularly simply when the two signals respectively have two mutually different amplitude steps, i.e. when the two signals consist of rectangular pulses, which follow one another at different time intervals.

In this respect, both signals are preferably built up from sequential individual signals each of the same length, with the individual signals each having either the first or the second amplitude step. The length of the individual signals thereby, for example, corresponds to the length of the period of a clock generator contained in the light sensor.

It is of advantage when the two amplitude steps of the two signals are arranged symmetrically about zero. In this case, the two signals are bipolar signals, which leads in an advantageous manner to the line of symmetry of the correlation function or the output voltage of a correlator producing the correlation function being able to adopt the value zero. Thus, the line of symmetry is in advantageous manner independent of the respectively given level of reception.

It is furthermore advantageous when the mentioned amplitude step of the correlation function is so steep that its temporal extent lies approximately in the length of or below the length of an individual signal forming the two signals to be correlated. With a steepness of this kind a particularly good accuracy can be achieved with respect to the sensing distance to be determined.

The respective signal shapes which are to be used for the two signals to be correlated are preferably found by computer assisted searching, with the signals, which are, for example, generated by means of a random number generator being subsequently correlated, and with the correlation function formed in this manner being analyzed. The randomly found signals are then admitted as useful when the correlation function satisfies particular criteria, in particular, when it has an amplitude step of the above described kind.

It is advantageous when the values of the correlation function before the amplitude step lie above an upper threshold and when they lie below a lower threshold after the amplitude step. In the same way, the values of the correlation function can, however, also lie below a lower threshold before the amplitude step and above an upper threshold after the amplitude step. The line of symmetry of the correlation function, already mentioned above, preferably lies approximately at the middle between the upper and lower thresholds.

In order to achieve the non-linearity of the correlation function desired in accordance with the invention, the two signals to be correlated may not have the same signal shapes with respect to each other. In particular, it is sensible if the two signals are so different from another that they have values which differ from one another within one period, at least in a region of 50% of this period.

A particularly advantageous embodiment of the invention can be realized in that the position of the amplitude step of the correlation function can be optionally shifted within one period in order, in this way, to be able to adapt the light sensor to the respectively desired different sensing distances. A shift of the amplitude step of this kind, or a corresponding change of the correlation function, can be achieved either by modification of the signal shapes that are used or by the setting of delay times, which bring about a time shift between the two signals to be correlated.

It is preferred if, for this purpose, an adjustable delay element is inserted between the signal generator producing the first signal and the light transmitter in order to produce a delayed signal which energizes the light transmitter. In just the same way, or additionally thereto, it is, however, also possible to insert an adjustable delay element between the signal generator which produces the second signal and the correlation stage in order to produce a delayed second signal.

The setting of the delay times or the shifting of the amplitude step within the correlation function can, for example, take place via the teach key provided on the light sensor or via a PC connected to the light sensor. Thus, the light sensor of the invention can be adapted in the simplest manner to different, respectively desired sensing distances.

DETAILED DESCRIPTION OF THE PREFERRED EXEMPLARY EMBODIMENTS

Figure 1:
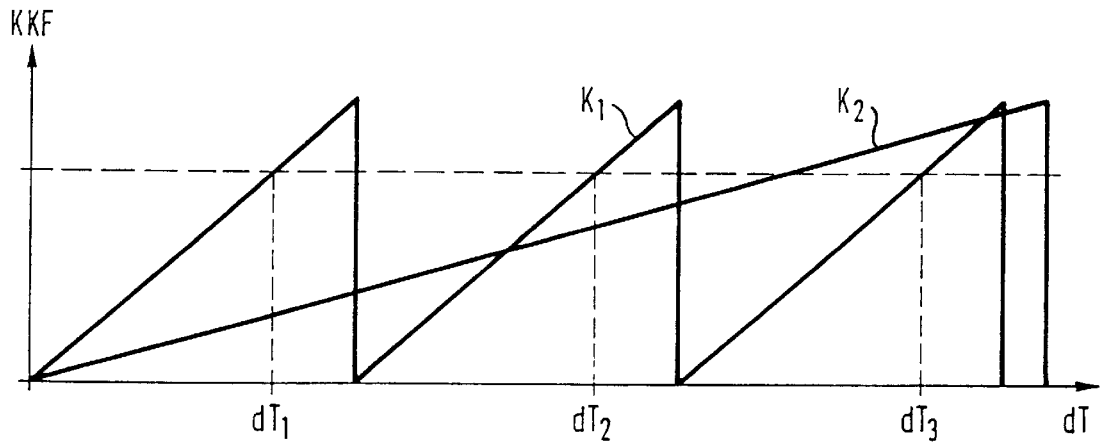
FIG. 1 shows the shape of correlation functions for light sensors in accordance with internal prior art of the applicants.

FIG. 1 shows two cross correlation functions $K_1$ and $K_2$ of a light sensor in accordance with the internal prior art of the applicants, in which the cross correlation function between the transmitted and received signal is formed, with these two signals having the same signal shape. The cross correlation function $K_1$ has a comparatively steep characteristic with a short period, whereas the cross correlation function $K_2$ has a shallow gradient with a longer period. The short period of the cross correlation function $K_1$ causes problems in a disadvantageous manner with respect to the range of ambiguity because it is not straightforwardly possible to determine the region of the three rising characteristic sections in which the actually measured value is to be placed. With a measured value of the cross correlation function $K_1$, three different shifts $dT_1$, $dT_2$, or $dT_3$ of the two correlated signals can consequently be present.

For the shape of the cross correlation function $K_2$, the relatively low gradient of this function is a disadvantage because it leads to a low accuracy of the detected shift of the two correlated functions, i.e. of the sensing distance which is found.

Figure 2:
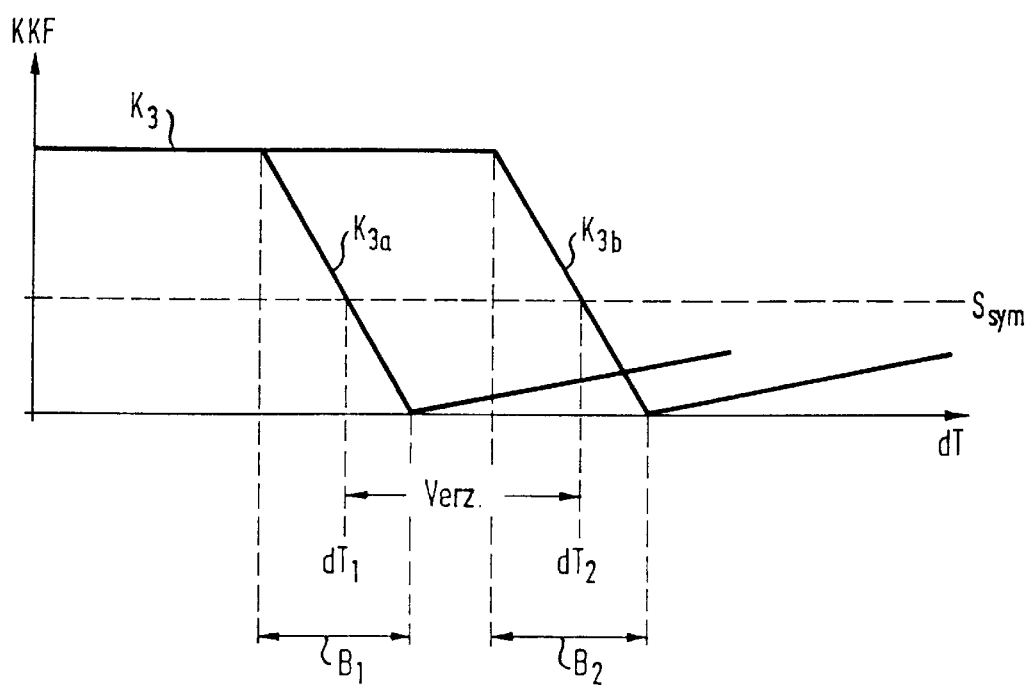
FIG. 2 shows the shape of a correlation function of a light sensor in accordance with the invention.

FIG. 2 shows two selectively adjustable shapes of a non-linear cross correlation function $K_3$ in accordance with the invention. Typical for these shapes is a substantially constant shape of the cross correlation function over an initial range, whereupon a relatively steep decline of the cross correlation function takes place. After this decline of the cross correlation function, it either extends at a substantially constant low value or rises slowly as shown in FIG. 2. The determining value dT for the sensing distance to be found is determined by investigating at which value dT the cross correlation function $K_3$ intersects the line of symmetry $S_{sym}$.

With the shape in accordance with $K_{3a}$, the determining decline of the cross correlation function takes place in the region $B_1$. The relevant sensing distance corresponds to the value $dT_1$, which signifies that it is possible to determine, with a light sensor with the correlation function $K_{3a}$ whether a sensed object is located in front of or behind a distance which corresponds to $dT_1$, with it being possible to exactly determine the precise position of the sensed object in a range which corresponds to the range $B_1$.

If one wishes to set a different determining sensing distance in a light sensor in accordance with the invention, then the characteristic of the cross correlation function is shifted by one of the measures already described above so that, for example, a shape of the characteristic $K_{3b}$ results. Here the precise position of the sensed object can be determined within a range $B_2$.

Figure 3:
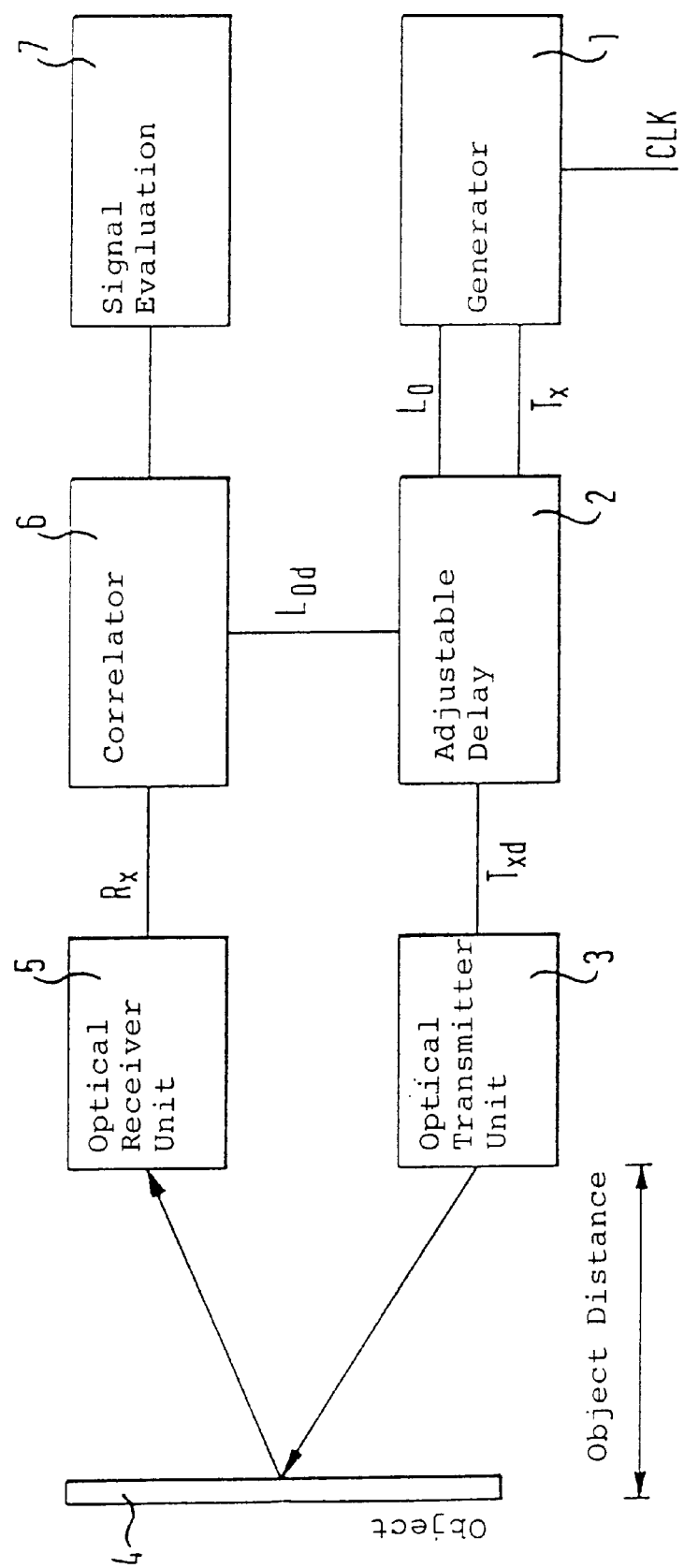
FIG. 3 is a block circuit diagram of the layout of a light sensor of the invention.

FIG. 3 shows a block circuit diagram of a light sensor in accordance with the invention.

A signal generator 1 is energized by a clock CLK and generates two signals $T_x$ and $L_0$ which are different from one another. Both signals are supplied to a delay element 2, by means of which either the signal $T_x$ or the signal $L_0$ or both signals $T_x$, $L_0$ can be delayed. The delayed signal $T_{xd}$ then passes from the delay element 2 to an optical transmitting unit 3, which transmits a light signal in the direction of the object 4. The shape or variation of the amplitude of the light signal thereby corresponds to the signal shape of the signal $T_{xd}$.

The object 4 reflects the light transmitted by the optical transmitting unit 3 and directs this to an optical receiver unit 5, which converts the received light into an electrical signal $R_x$, the signal shape of which corresponds to the shape or variation of the amplitude of the received light.

The signal $R_x$ is supplied to a correlator 6, which is moreover acted on by the delayed signal $L_{0d}$.

In the correlator 6 the cross correlation function is formed between the two signals $R_x$ and $L_{0d}$ and is supplied to a signal evaluation unit 7.

The light sensor in accordance with FIG. 3 can be adapted to different object spacings between the light sensor and the object 4 by setting the delay of the signal $T_x$ and/or $L_0$, which can be done by means of the delay unit 2.

Figure 4:
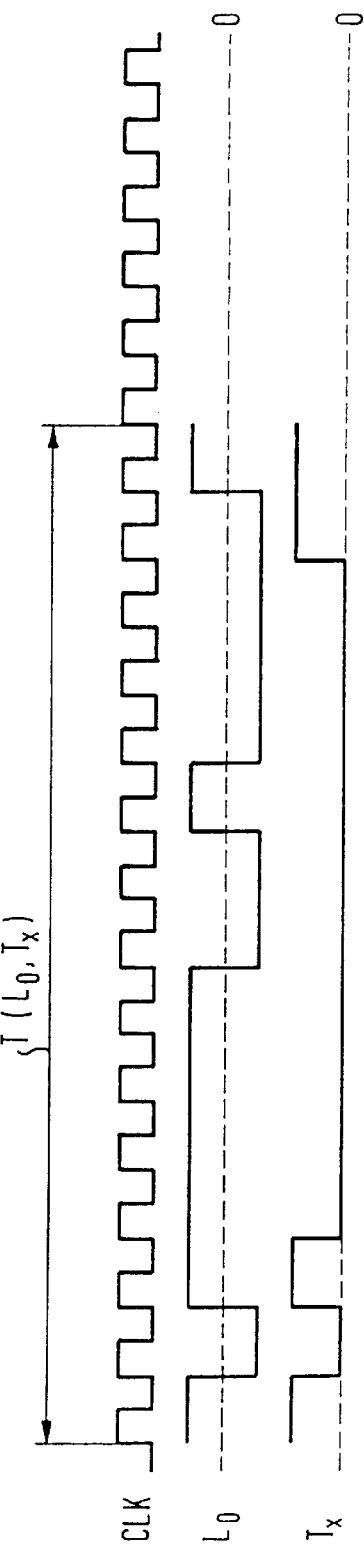
FIG. 4 shows the time dependent shape of the first signal $T_x$, which energizes the light transmitter, and also of the second signal $L_0$, which is used for the formation of the correlation function in a light sensor in accordance with the invention.

FIG. 4 shows the shape of the clock signal CLK which acts on the generator 1 in accordance with FIG. 3 and which forms a periodically repeating sequence of rectangular pulses.

Below the clock signal CLK there is shown the signal $L_0$ generated by the generator 1 in accordance with FIG. 3, which has two amplitude steps lying symmetrically about zero. The period length $T(L_0)$ of the signal $L_0$ corresponds to 15 clock cycles of the signal CLK.

Beneath the signal $L_0$ there is likewise shown the signal $T_x$ generated by the generator 1 of FIG. 3, which has two different amplitude values, namely 0 and 1. The period length $T(T_x)$ of the signal $T_x$ likewise amounts to 15 clock cycles of the signal CLK.

In practice it is entirely conceivable to use also signals $L_0$, $T_x$ having period lengths which correspond to more than 15 and in particular to several hundred clock cycles of the signal CLK.

Illustrated in standardized amplitude values, the shape of the amplitude curve of the two signals $L_0$ and $T_x$ within one period can be illustrated as follows:
$L_0$ 1-1 1 1 1 1 1 1-1-1 1-1-1-1-1 1
$T_x$ 1 0 1 0 0 0 0 0 0 0 0 0 1 1
The cross correlation function of the two above signals can be illustrated as follows in standardized form:
KKF 2 2 2 2 4 2 2 2 -2-2-2-2-2-2-2
The determining amplitude step of the above cross correlation function takes place at the step from the value 2 to the value −2. Since the cross correlation function has a period of 15 clock cycles, the range of non-ambiguity of the light sensor also corresponds to 15 clock cycles.

In the present case, the ideal situation is for the shape of the two signals $T_x$. and $L_0$ to be selected so that the relevant step in the cross correlation function takes place from the value 4 to the value −4. The standardized level of the amplitude step then amounts to 8. In practice it is, however, sufficient if the amplitude step amounts to half the maximum possible value, i.e. to 4 as in the present case.

Figure 5:
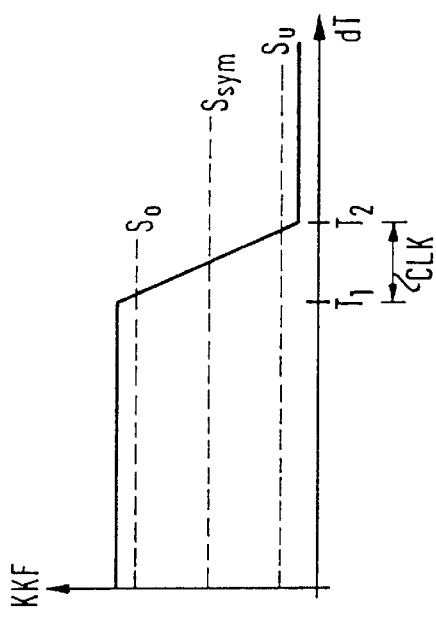
FIG. 5 is a further example for the shape of the correlation function in a light sensor in accordance with the invention.

FIG. 5 shows the schematic shape of a cross correlation function obtained in practice in the processing of the signals in accordance with FIG. 4. The two signals to be correlated with one another are multiplied in the correlator responsible for the formation of the cross correlation function, whereupon a low pass filtering also takes place within the context of the subsequent signal evaluation.

The shape in accordance with FIG. 5 shows that the relevant amplitude step takes place within a clock cycle $T_2-T_1$, with the amplitude of the cross correlation function lying above the threshold $S_0$ before this amplitude step and lying beneath the threshold Su after the amplitude step.

Thus, if a determination is made that the value of the cross correlation function which has been found lies above the threshold $S_0$ for a specific received signal, then the object lies in the foreground, i.e. in the front of the set sensing distance. If the value of the cross correlation function, however, lies beneath the threshold $S_U$, then the object lies in the background, i.e. behind the sensing distance.

If the value of the cross correlation function which is determined corresponds to the value $S_{sym}$ drawn in in FIG. 5, which is preferably equal to zero, then the object is either present precisely at the set sensing distance or no object is present at all. This ambiguity must be precluded by an additional check, with, for example, the parallel determination of the received energy being suitable for this purpose. If the received energy lies beneath a predetermined threshold, then no object is present. If it lies above the threshold, then the object is located precisely at the set scanning distance.

If a value of the cross correlation function between $S_U$ and $S_0$ is determined, then, as a result of the steep shape of the cross correlation function in the corresponding range, it is possible to make a very accurate conclusion concerning the distance between the object and the light sensor.

What is claimed is:

1. A light sensor comprising a light transmitter for transmitting a light signal ($T_x$, $T_{xd}$) into a region to be monitored; a light receiver for receiving a reflected light signal ($R_x$) from an object present in the monitored region, at least one signal generator for producing a first signal ($T_x$) to energize the light transmitter and also for producing a second signal ($L_0$) standing in a defined phase relationship to the first signal ($T_x$), but with a different signal shape in comparison to the first signal ($T_x$), and also a correlator for producing a correlation function (KKF) between the reflected light signal ($R_x$) and the second signal ($L_0$) as well as an evaluation unit following the correlator for determining information related to the distance between the light sensor and the object.

2. A light sensor in accordance with claim 1, wherein the first signal ($T_x$) and the second signal ($L_0$) have the same period length T ($L_0$, $T_x$).

3. A light sensor in accordance with claim 1, wherein the correlation function (KKF) has an amplitude step in the range of one period, which is larger and/or steeper than all further amplitude steps which occur during one period.

4. A light sensor in accordance with claim 1, wherein both signals ($T_x$, $L_0$) each have only two amplitude steps different from one another.

5. A light sensor in accordance with claim 4, wherein both signals ($T_x$, $L_0$) are built up of sequential individual signals, each of the same length ($T_{CLK}$), with the individual signals each having the first or the second amplitude step.

6. A light sensor in accordance with claim 4, wherein both amplitude steps of the second signal ($L_0$) are arranged symmetrically about zero.

7. A light sensor in accordance with claim 4, wherein the correlation function (KKF) has an amplitude step in the range of one period which is larger and/or steeper than all further amplitude steps which occur during one period and the amplitude step is so steep that its extent timewise lies approximately in the range of the length ($T_{CLK}$) of an individual signal or below.

8. A light sensor in accordance with claim 3, wherein the values of the correlation function (KKF) before the amplitude step lie above or below an upper or lower threshold ($S_0$, $S_u$) respectively, and lie below or above a lower or upper respective threshold ($S_u$,$S_0$) after the amplitude step.

9. A light sensor in accordance with claim 1, wherein the signal shapes to the two signals ($T_x$, $L_0$) are found by computer-aided search and subsequent analysis of the respective correlation function (KKF) is performed.

10. A light sensor in accordance with claim 1, wherein the values of the correlation function (KKF) fluctuate about the amplitude value zero and/or wherein the correlation function (KKF) has no DC component.

11. A light sensor in accordance with claim 3, wherein the correlation function (KKF) has an amplitude step in the range of one period, which is larger and/or steeper than all further amplitude steps which occur during one period and the time position of the amplitude step can be shifted by an adjustment process which can be effected by the user of the light sensor within one period of the correlation function (KKF), whereby the light sensor can be matched to different sensing distances.

12. A light sensor in accordance with claim 1, wherein two signals ($T_x$, $L_0$) arranged without phase shift have values which differ from one another within one period, at least in a range of 50% of the period.

13. A light sensor in accordance with claim 1, wherein an adjustable delay element is inserted between the signal generator generating the first signal ($T_x$) and the light transmitter to produce a delayed signal ($T_{xd}$) which energizes the light transmitter.

14. A light sensor in accordance with claim 1, wherein an adjustable delay element is inserted between the signal generator generating the second signal ($L_0$) and the correlator to produce a delayed signal ($L_{0d}$).

* * * * *